US009758171B2

(12) United States Patent
Martini et al.

(10) Patent No.: US 9,758,171 B2
(45) Date of Patent: Sep. 12, 2017

(54) METHOD AND APPARATUS FOR CONTROLLING A MULTI-MODE POWERTRAIN SYSTEM INCLUDING AN ENGINE HAVING STOP/START CAPABILITY

(71) Applicant: GM GLOBAL TECHNOLOGY OPERATIONS LLC, Detroit, MI (US)

(72) Inventors: Ryan D. Martini, Wolverine Lake, MI (US); Brett T. Muller, Milford, MI (US); Eric Piper, Fenton, MI (US); James Kenney, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 3 days.

(21) Appl. No.: 14/739,313

(22) Filed: Jun. 15, 2015

(65) Prior Publication Data

US 2016/0362110 A1 Dec. 15, 2016

(51) Int. Cl.

| | |
|---|---|
| ***B60W 30/194*** | (2012.01) |
| ***B60W 10/30*** | (2006.01) |
| ***B60W 10/06*** | (2006.01) |
| ***F01P 7/16*** | (2006.01) |
| *B60H 1/00* | (2006.01) |
| *B60H 1/03* | (2006.01) |
| *B60W 30/18* | (2012.01) |

(52) U.S. Cl.

CPC .......... *B60W 30/194* (2013.01); *B60W 10/06* (2013.01); *B60W 10/30* (2013.01); *F01P 7/165* (2013.01); *B60H 1/00885* (2013.01); *B60H 1/03* (2013.01); *B60W 30/18018* (2013.01); *B60W 2510/0676* (2013.01); *Y10S 903/902* (2013.01)

(58) Field of Classification Search

None

See application file for complete search history.

(56) References Cited

U.S. PATENT DOCUMENTS

| | | | | |
|---|---|---|---|---|
| 2008/0060592 A1* | 3/2008 | Mehring | F01P 3/02 | 123/41.72 |
| 2012/0017637 A1* | 1/2012 | Nakajo | B60H 1/03 | 62/515 |
| 2012/0215429 A1* | 8/2012 | Yumisashi | B60W 30/192 | 701/112 |
| 2013/0144515 A1* | 6/2013 | Okamoto | F02D 45/00 | 701/113 |
| 2014/0005872 A1* | 1/2014 | Teraya | B60W 10/06 | 701/22 |

(Continued)

*Primary Examiner* — John R Olszewski
*Assistant Examiner* — David Merlino
(74) *Attorney, Agent, or Firm* — Quinn IP Law

(57) ABSTRACT

A multi-mode powertrain system is described, and includes an internal combustion engine having stop/start capability. A method for controlling the multi-mode powertrain system includes circulating coolant to a heater core via an engine fluidic circuit that includes a water jacket of the internal combustion engine when temperature of the coolant is less than an engine fluidic circuit upper temperature threshold and the engine is in an ON state. Coolant is circulated to the heater core via a bypass fluidic circuit that excludes the water jacket of the internal combustion engine when temperature of the coolant is greater than a bypass fluidic circuit lower temperature threshold when the engine is in an OFF state.

7 Claims, 3 Drawing Sheets

310
301 302 303 304 305 306 307 308 309
316 315 314 313
312 317 312 311
320 1 0
330 1 0
340 1 0

(56) References Cited

U.S. PATENT DOCUMENTS

2014/0024492 A1* 1/2014 Dextreit ................ B60W 10/30
477/3
2014/0103128 A1* 4/2014 Patel .................. B60H 1/00885
237/5
2014/0223950 A1* 8/2014 Janeling ................ B60H 1/005
62/333
2015/0129161 A1* 5/2015 Nishikawa ......... B60H 1/00271
165/43
2015/0275741 A1* 10/2015 Amano ................ B60W 10/06
60/320

* cited by examiner

METHOD AND APPARATUS FOR CONTROLLING A MULTI-MODE POWERTRAIN SYSTEM INCLUDING AN ENGINE HAVING STOP/START CAPABILITY

TECHNICAL FIELD

The present disclosure relates to powertrain systems for vehicles, and associated heating circuits for passenger compartments of vehicles.

BACKGROUND

Vehicles are equipped with heating, ventilation and air conditioning (HVAC) systems for controlling and maintaining suitable temperatures and humidity level in vehicle passenger compartments. One requirement for an HVAC system may include maintaining coolant temperature above a minimum threshold during operation in cold ambient conditions. Hybrid powertrain systems employing engine stop/start systems may experience a reduction in operation of the engine stop/start system due to a requirement to maintain the coolant temperature above a minimum threshold. This may include engine idling when the vehicle is stopped, which is undesirable. Engine operation when a vehicle is stopped may result in unnecessary charging of a battery for the hybrid powertrain system.

SUMMARY

A multi-mode powertrain system is described, and includes an internal combustion engine having stop/start capability. A method for controlling the multi-mode powertrain system includes circulating coolant to a heater core via an engine fluidic circuit that includes a water jacket of the internal combustion engine when temperature of the coolant is less than an engine fluidic circuit upper temperature threshold and the engine is in an ON state. Coolant is circulated to the heater core via a bypass fluidic circuit that excludes the water jacket of the internal combustion engine when temperature of the coolant is greater than a bypass fluidic circuit lower temperature threshold when the engine is in an OFF state.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
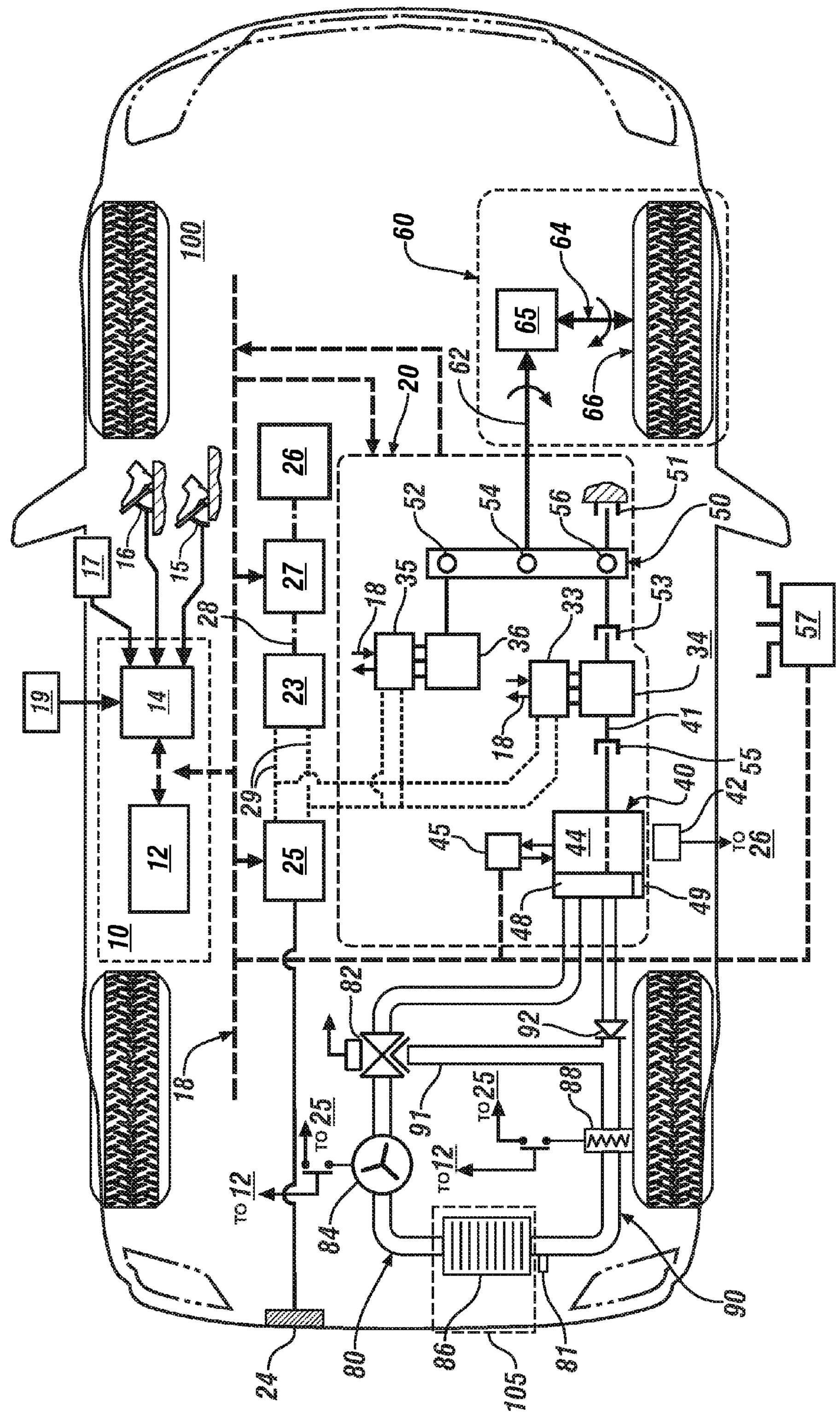
FIG. 1 schematically shows a vehicle including a multi-mode powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including a multi-mode powertrain system 20 coupled to a driveline 60 and controlled by a control system 10. Like numerals refer to like elements throughout the description. The powertrain system 20 includes multiple torque-generating devices including an internal combustion engine (engine) 40 and first and second electrically-powered torque machines (electric machines) 34, 36, respectively, that transfer torque through a gear train 50 to a driveline 60. The first and second electric machines 34, 36 electrically connect to a high-voltage energy storage device (HV battery) 25. The engine 40 is configured for engine stop/start operations, including executing autostart and autostop routines during vehicle operation. Other configurations of the powertrain system 20 that include an embodiment of the engine 40 with engine stop/start capability may instead be employed within the scope of this disclosure.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form in-cylinder combustion charges that generate an expansion force that is transferred via pistons and connecting rods to a crankshaft 44 to produce torque. Operation of the engine 40 is controlled by an engine controller (ECM) 45. The engine 40 may include a low-voltage solenoid-actuated electrical starter 42 for engine starting in response to a key-crank event in one embodiment.

The engine 40 is fabricated with a water jacket 48 for circulating cooling fluid to various engine components to extract heat and control temperature of the engine 40 during engine operation. This preferably includes a cooling circuit including an air/cooling fluid radiator. The water jacket 48 fluidly connects to a heating circuit that includes a heater core 86 that is an element of a passenger compartment heating system that is arranged in the vehicle 100 to supply heat to a passenger compartment 105. The heating circuit includes a first, engine fluidic circuit 80 and a second, bypass fluidic circuit 90 through which coolant may pass. The coolant may be a mixture of water and ethylene glycol or another suitable heat-transfer fluid for circulating in an internal combustion engine. As shown, the engine fluidic circuit 80 and the bypass fluidic circuit 90 have elements in common, including the heater core 86, an electrically-controllable fluidic pump 84, a three-way valve 82, and a supplemental electrically-controlled fluidic heater (supplemental coolant heater) 88. The supplemental coolant heater 88 may be a resistive device or another configuration that has some contact with the coolant and is capable of transferring heat generated by electrical resistance to the coolant via conduction or another suitable heat transfer mode. The three-way valve 82 includes an inlet pipe that fluidly couples to an outlet of the fluidic pump 84, one outlet that fluidly couples to an inlet of the water jacket 48 and a second outlet that fluidly couples to a bypass pipe 91, which fluidly couples via a tee connection to the supplemental coolant heater 88. An outlet of the water jacket 48 fluidly couples via a one-way check valve 92 and the tee connection to the supplemental coolant heater 88. As such, when the three-way valve 82 is controlled to a first position, coolant circulates through the water jacket 48, the one-way check valve 92, the supplemental coolant heater 88 and the heater core 86 by action of the pump 84. When the three-way valve 82 is controlled to a second position, coolant circulates through the bypass pipe 91 and the supplemental coolant heater 88 to the heater core 86 by action of the pump 84, thus bypassing the water jacket 48 of the engine 40. The pump 84 is controlled by a control signal originating from the control system 10, which electrically connects the pump 84 to a low-voltage battery 27 via a controllable switch or another suitable controllable mechanism. The pump control signal may be a pulsewidth-modulated control signal, or another suitable electric power control signal. Heating of coolant by the supplemental coolant heater 88 is controlled by a control signal originating from the control system 10, which electrically connects the supplemental coolant heater 88 to the HV battery 25 via a controllable switch or another suitable controllable mechanism. The heater power control signal may be a pulsewidth-modulated control signal, or another suitable electric power control signal. The position of the three-way valve 82 is preferably controlled by a control signal originating from the control system 10. Preferably, a coolant temperature sensor 49 monitors temperature of the coolant in the water jacket 48. In one embodiment, a second temperature sensor 81 monitors temperature of the coolant upstream of the heater core 86. A second fluidic pump that is belt-driven off the engine 40 circulates coolant through the engine 40 and the heater core when the engine 40 is operating.

The engine 40 may be configured to execute autostart and autostop control routines, fuel cutoff (FCO) control routines and cylinder deactivation control routines during ongoing operation of the powertrain system 20. The engine 40 is considered to be in an OFF state when it is not rotating. The engine 40 is considered to be in an ON state when it is rotating, including one or more FCO states in which it is spinning and unfueled. Control routines for executing autostart and autostop operation, FCO operations and cylinder deactivation operations are known and not described in detail herein.

One embodiment of the internal combustion engine 40 and the first and second electric machines 34, 36 coupled to transfer torque through gear train 50 to driveline 60 to generate propulsion torque is now described. In one embodiment, the gear train 50 is a simple planetary gear set including a sun gear 52, a planet gear and carrier 54, and a ring gear 56. As shown, the crankshaft 44 of the internal combustion engine 40 couples via a third clutch 55 to an input member 41 that couples to the first electric machine 34. An output member of the first electric machine 43 couples via a second clutch 53 to the ring gear 56. The ring gear 56 is couplable via a first clutch/brake 51 to a chassis ground. The second electric machine 36 rotatably couples to the sun gear 52, and the planet gear carrier 54 couples via output member 62 to the driveline 60. A transmission controller (TCM) 57 monitors rotational speeds and controls activations of the first, second and third clutches 51, 53 and 55.

The first and second electric machines 34, 36 are preferably HV multi-phase electric motor/generators configured to convert stored electric energy to mechanical power and convert mechanical power to electric energy that may be stored in a HV energy storage device, e.g., HV battery 25. The HV battery 25 may be any high-voltage energy storage device, e.g., a multi-cell lithium ion device, an ultracapacitor, or another suitable device without limitation. In one embodiment, the HV battery 25 may electrically connect via an on-vehicle battery charger 24 to a remote, off-vehicle electric power source for charging while the vehicle 100 is stationary. The HV battery 25 electrically connects to the first inverter module 33 via a HV DC bus 29 to transfer HV DC electric power to the first electric machine 34 in response to control signals originating in the control system 10. Likewise, the HV battery 25 electrically connects to the second inverter module 35 via the HV DC bus 29 to transfer HV DC electric power to the second electric machine 36 in response to control signals originating in the control system 10.

Each of the first and second electric machines 34, 36 includes a rotor and a stator, and electrically connects via corresponding first and second inverter circuits 33, 35, respectively, and a HV bus 29 to the HV battery 25. The first and second inverter modules 33, 35 are both configured with suitable control circuits including power transistors, e.g., IGBTs for transforming HV DC electric power to HV AC electric power and transforming HV AC electric power to HV DC electric power. Each of the first and second inverter modules 33, 35 preferably employs pulsewidth-modulating (PWM) control to convert stored DC electric power originating in the HV battery 25 to AC electric power to drive the respective first and second electric machines 34, 36 to generate torque. Similarly, each of the first and second inverter modules 33, 35 converts mechanical power transferred to the respective first and second electric machines 34, 36 to DC electric power to generate electric energy that is storable in the HV battery 25, including as part of a regenerative control strategy. The first and second inverter modules 33, 35 are both configured to receive motor control commands and control inverter states to provide the motor drive and regenerative braking functionality. In one embodiment, a DC/DC electric power converter 23 electrically connects to a low-voltage bus 28 and the low-voltage battery 27, and electrically connects to the HV bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats, and the low-voltage solenoid-actuated electrical starter 42.

The driveline 60 may include a differential gear device 65 that mechanically couples to an axle 64, transaxle or half-shaft that mechanically couples to a wheel 66 in one embodiment. The driveline 60 transfers tractive power between the transmission 50 and a road surface.

The operator interface 14 of the vehicle 100 includes a controller that signally connects to a plurality of human/machine interface devices through which the vehicle operator commands operation of the vehicle 100. The human/machine interface devices include, e.g., an accelerator pedal 15, a brake pedal 16, a transmission range selector (PRNDL) 17 and a temperature selector 19 for commanding a preferred temperature in the passenger compartment 105. Other human/machine interface devices preferably include an ignition switch to enable an operator to crank and start the engine 40, a steering wheel, and a headlamp switch. The accelerator pedal 15 provides signal input indicating an accelerator pedal position and the brake pedal 16 provides signal input indicating a brake pedal position. The transmission range selector 17 provides signal input indicating direction of operator-intended motion of the vehicle including a discrete number of operator-selectable positions indicating the preferred rotational direction of the output member 62 in either a forward or a reverse direction.

The control system 10 includes controller 12 that signally connects to the operator interface 14. The controller 12 preferably includes a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the HV battery 25, the first and second inverter modules 33, 35, the ECM 45 and the TCM 57, either directly or via a communications bus 18 to monitor and control operation thereof. The control system 10 also communicatively connects with the electrically-controllable fluidic pump 84, the three-way valve 82, and the supplemental coolant heater 88.

The controller 12 commands operation of the powertrain system 20, including controlling a charge mode that is either a charge-sustaining mode or a charge-depleting mode. The charge-depleting mode includes operating with the engine 40 in the OFF state. The engine 40 may be in either the ON or the OFF state when operating in the charge-sustaining mode. The charge-sustaining mode indicates powertrain operation wherein SOC of the HV battery 25 is preferably maintained at a predetermined level with a possibility of short-term variations associated with vehicle operation. The charge-depleting mode indicates powertrain operation wherein SOC of the HV battery 25 is preferably depleted at a predetermined rate, with a possibility of short-term variations associated with vehicle operation. The charge-depleting mode may be forcibly ended when the SOC of the HV battery 25 reaches a minimum allowable SOC.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event.

The powertrain system 20 includes a communications scheme including the communications bus 18 to effect communications in the form of sensor signals and actuator command signals between the control system 10 and elements of the vehicle 100 and the powertrain system 20. The communications scheme employs one or more communications systems and devices, including, e.g., the communications bus 18, a direct connection, a local area network bus, a serial peripheral interface bus, and wireless communications to effect information transfer. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
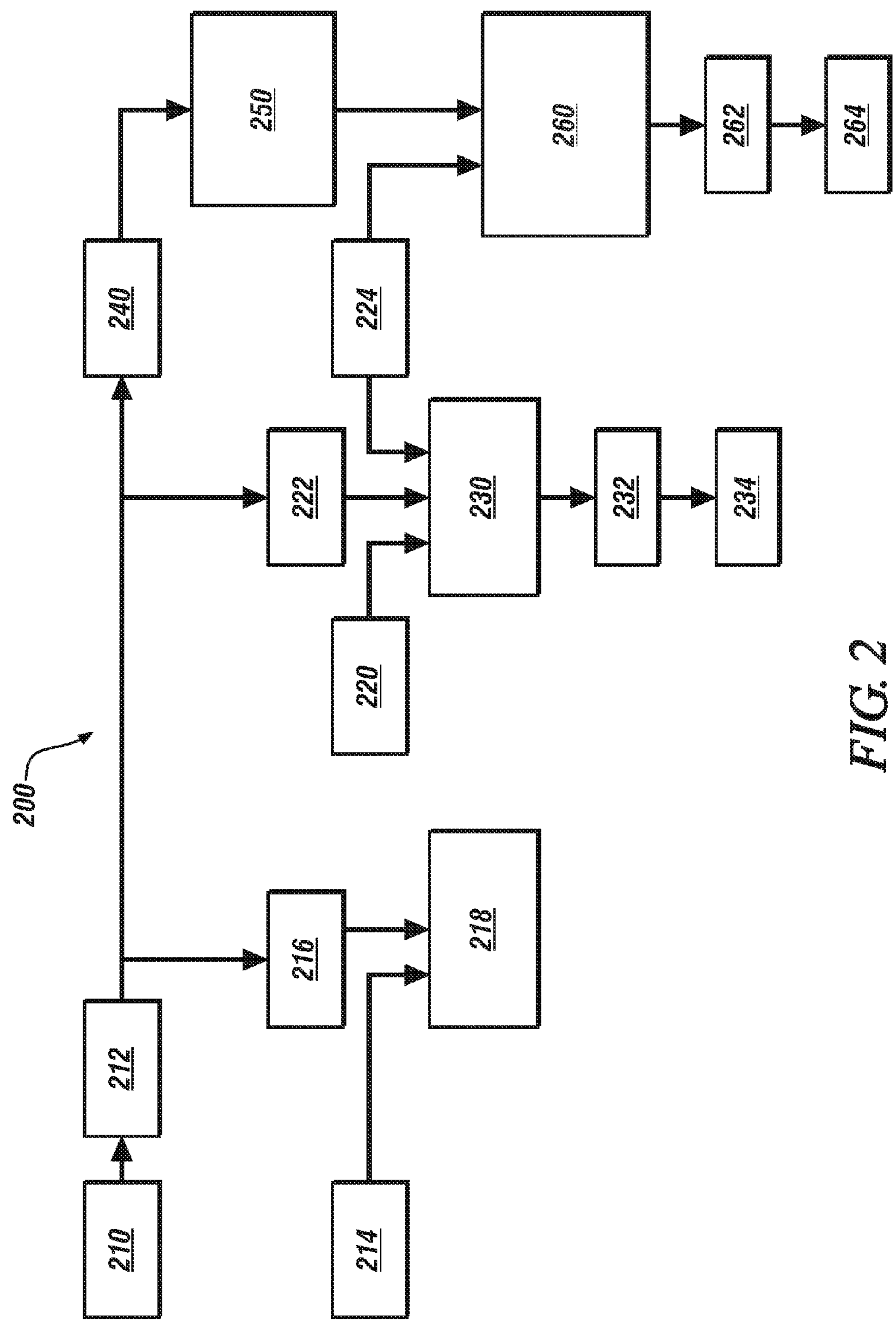
FIG. 2 schematically shows a coolant system control routine for controlling operation of an embodiment of the powertrain system described with reference to FIG. 1 to manage heat transfer to the passenger compartment of the vehicle, in accordance with the disclosure.

FIG. 2 schematically shows a coolant system control routine 200 for controlling operation of an embodiment of the powertrain system 20 described hereinabove, wherein such control includes managing heat transfer to the passenger compartment 105 of the vehicle 100 in which the powertrain system 20 is operating. Table 1 is provided as a key wherein the numerically labeled blocks and the corresponding functions are set forth as follows, corresponding to the coolant system control routine 200.

TABLE 1

| BLOCK | BLOCK CONTENTS |
|---|---|
| 200 | Coolant System Control Routine |
| 210 | Monitor HVAC control inputs |
| 212 | Determine a demand temperature for heater core based upon HVAC control inputs |
| 214 | Monitor heater core inlet temperature |
| 216 | Determine hysteresis for supplemental coolant heater |
| 218 | Command operation of supplemental coolant heater based upon hysteresis and heater core inlet temperature |
| 220 | Monitor SOC, charge mode |
| 222 | Determine engine thermal hysteresis |
| 224 | Monitor engine coolant temperature |
| 230 | Select Engine ON/OFF state based upon SOC, engine thermal hysteresis, and engine coolant temperature |
| 232 | Execute autostop or autostart routine as needed |
| 234 | Delay deactivating supplemental coolant heater after executing autostart routine |
| 240 | Compare heat capacity of supplemental coolant heater and the demand temperature for heater core |
| 250 | Execute temperature-based bypass valve control strategy based upon heat capacity of supplemental coolant heater and engine thermal hysteresis |
| 260 | Select preferred one of the engine fluidic circuit and the bypass fluidic circuit based upon the temperature-based bypass valve control strategy and the coolant temperature |

TABLE 1-continued

| BLOCK | BLOCK CONTENTS |
| --- | --- |
| 262 | Control bypass valve based upon the selected one of the engine fluidic circuit and the bypass fluidic circuit |
| 264 | Delay activating supplemental coolant heater after activating the bypass fluidic circuit |

The coolant system control routine 200 is arranged as one or a plurality of executable control routines and associated calibrations that are stored in the memory devices of the control system 10, and preferably operates as follows. In one embodiment, the coolant system control routine 200 only executes when ambient temperature is less than a threshold temperature, e.g., less than 18 C. During ongoing vehicle operation, the control system 10 monitors various parameters, including monitoring operator inputs to vehicle HVAC controls including the temperature selector 19 command a preferred temperature in the passenger compartment 105 of the vehicle 100 (210). Other monitored operating parameters include coolant temperature, preferably measured by the coolant temperature sensor 49 in the engine 40 (224), battery SOC for the HV battery 25 and charge mode (220). The charge mode is a selected one of the charge-sustaining mode and the charge-depleting mode.

A demand temperature for the heater core 86 may be determined based upon the preferred temperature in the passenger compartment 105 of the vehicle 100 (212), with such a determination based upon factors related to a heat exchange capacity of the heater core 86 and heating needs of the passenger compartment 105.

A heating hysteresis model for estimating heat transfer from the supplemental coolant heater 88 to the coolant is preferably developed and takes into account factors related to heat capacity of the coolant and thermal inertia and heat capacity of the supplemental coolant heater 88 (216). The heating hysteresis model may be developed based upon specific heat of the coolant and circuit components, heat capacities of the components, physical layout and relationship of the components and the heat transfer elements, and other factors.

Concurrently, the control system 10 monitors or otherwise determines an inlet temperature to the heater core 86 (214). The inlet temperature may be determined by direct monitoring using the temperature sensor 81 on systems so equipped, or alternatively, by indirect monitoring using a dynamically executing thermal model that determines the inlet temperature based upon the coolant temperature measured by the coolant temperature sensor 49 in the engine 40, or by another suitable method.

Operation of the supplemental coolant heater 88 is commanded based upon the heating hysteresis for the supplemental coolant heater 88 and the inlet temperature of the heater core 86 (218), with such operation related to commanding electric power into the supplemental coolant heater 88 for conversion to heat energy and transferred via circulating coolant to the heater core 86. As such, operation of the supplemental coolant heater 88 may be delayed subsequent to commanding the engine OFF state because the coolant is able to transfer heat through the engine fluidic circuit 80 to heat the cabin. Furthermore, operation of the supplemental coolant heater 88 may be initially delayed subsequent to executing a temperature-based bypass valve control strategy because the coolant is initially able to transfer heat through the bypass fluidic circuit 90 to heat the cabin. Furthermore, operation of the supplemental coolant heater 88 may be continued subsequent to commanding the engine ON state to maintain coolant temperature in the bypass fluidic circuit 90. Furthermore, operation of the supplemental coolant heater 88 may be deactivated prior to ending the execution of the temperature-based bypass valve control strategy because of thermal inertia in the bypass fluidic circuit 90, which may be employed to heat the cabin.

An engine thermal hysteresis model for the engine 40 based upon coolant temperature is preferably developed and takes into account factors related to the engine heat capacity, thermal inertia and heat transfer to the coolant (222). The engine thermal hysteresis model may be developed based upon specific heat of the coolant and engine components, heat capacities of the components, physical layout and relationship of the components and the heat transfer elements, and other factors.

The control system 10 selects one of the ON or OFF states for the engine 40 based upon the engine thermal hysteresis model, the coolant temperature and the battery SOC (230). The engine ON state is preferably commanded upon vehicle key-on, and remains in the ON state until the coolant temperature exceeds an engine fluidic circuit upper temperature threshold that is associated with the engine fluidic circuit 80. This is referred to as a first cycle of the engine ON state. The engine ON state is preferably commanded when the battery SOC is less than a lower threshold SOC, or when the coolant temperature is less than an engine fluidic circuit lower temperature threshold that is associated with the engine fluidic circuit 80. The engine OFF state is preferably commanded when the coolant temperature exceeds the engine fluidic circuit upper temperature threshold so long as the SOC of the HV battery 25 is greater than the lower threshold SOC.

One of the autostop or autostart routines may be executed as needed in response to the commanded engine OFF state or commanded engine ON state, respectively (232). This preferably includes delaying deactivating the supplemental coolant heater 88 after executing the autostart routine (234) to provide heat to the coolant while the engine 40 is warming up, but minimizing electric power consumption by the supplemental coolant heater 88 by extracting heat from the coolant through the heater core 86, taking advantage of the heat capacity and thermal inertia of the coolant and the bypass fluidic circuit 90. Concurrently, the coolant system control routine 200 evaluates the heat capacity of the supplemental coolant heater 88 to transfer heat to the coolant in relation to the demand temperature for the heater core 86 (240).

A temperature-based bypass valve control strategy may be executed based upon the heat capacity of the supplemental coolant heater 88, the demand temperature for the heater core 86 and the engine thermal hysteresis (250). The temperature-based bypass valve control strategy takes into consideration factors related to the thermal capacity and thermal inertia of the engine 40, heat transfer from the engine 40 and the supplemental coolant heater 88 to the heater core 86, and other factors to decide whether to control the three-way valve 82 in a manner that circulates coolant through the engine fluidic circuit 80 including the engine 40, or control the three-way valve 82 in a manner that circulates coolant only through the second, bypass fluidic circuit 90 and excluding the engine 40.

A preferred one of the engine fluidic circuit 80 and the bypass fluidic circuit 90 is selected based upon the temperature-based bypass valve control strategy and the coolant temperature (260). Such selection includes enabling coolant flow through the engine fluidic circuit 80 when the temperature of the coolant upstream of the heater core 86 is greater than a bypass fluidic circuit lower temperature threshold immediately after a cold start associated with a vehicle key-on event. Such selection includes enabling coolant flow through the bypass fluidic circuit 90 when the temperature of the coolant upstream of the heater core 86 is less than the bypass fluidic circuit lower temperature threshold. Such selection further includes discontinuing coolant flow through the bypass fluidic circuit 90 and enabling coolant flow through the engine fluidic circuit 80 when the coolant temperature exceeds a bypass fluidic circuit upper temperature threshold for second and subsequent engine ON operations after the first cycle of engine ON operation.

The three-way valve 82 is controlled based upon the selected one of the engine fluidic circuit 80 and the bypass fluidic circuit 90 (262). When the three-way valve 82 is controlled to enable coolant flow through the bypass fluidic circuit 90, there is preferably a scheduled time delay after activating the bypass fluidic circuit 90 before the supplemental coolant heater 88 is activated, with such time delay based upon the thermal capacities and thermal inertias (264). Thus, consumption of stored electric power used to heat the coolant through operation of the supplemental coolant heater 88 is minimized or at least delayed during operation that includes the bypass fluidic circuit 90.

Figure 3:
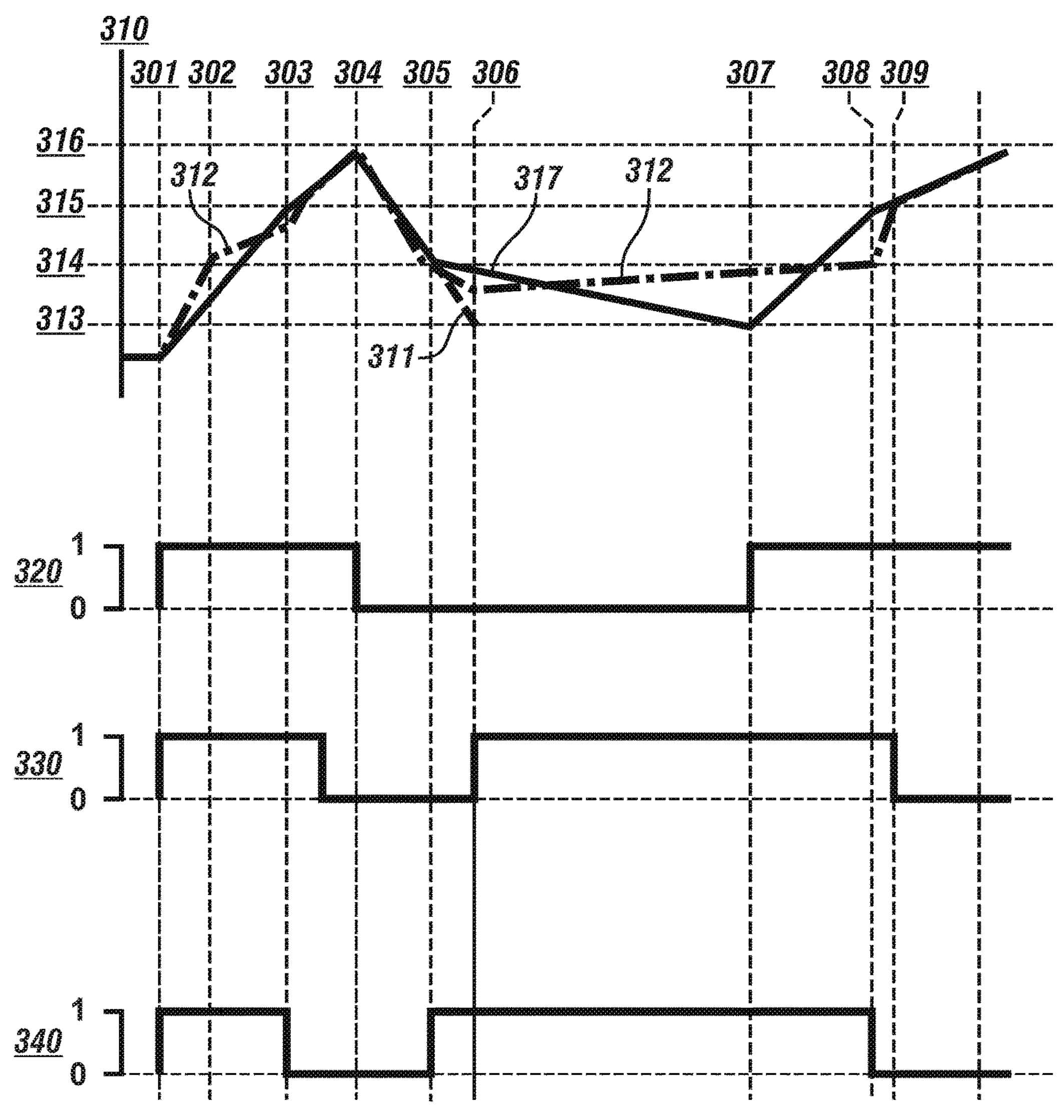
FIG. 3 graphically shows operation of an embodiment of the coolant system control routine described with reference to FIG. 2 as part of operation of the vehicle described with reference to FIG. 1, in accordance with the disclosure.

FIG. 3 graphically shows operation of an embodiment of the coolant system control routine 200 that is employed as part of operation of the vehicle 100 described with reference to FIG. 1. Monitored parameters include temperature 310, engine state 320 including ON (1) and OFF (0), supplemental coolant heater state 330 including ON (1) and OFF (0), and three-way valve state 340, including a first state (0) associated with operation in the engine fluidic circuit 80 and a second state (1) associated with operation in the bypass fluidic circuit 90. The temperature 310 includes threshold temperatures including the engine fluidic circuit lower temperature threshold 313, the bypass fluidic circuit lower temperature threshold 314, the bypass fluidic circuit upper temperature threshold 315 and the engine fluidic circuit upper temperature threshold 316. Plotted results include engine coolant temperature (ECT) 317 and heater core temperature 312. An original coolant temperature (T_ORG) 311 is plotted for purposes of comparison only. During the entire period shown, the battery SOC remains greater than a lower threshold SOC.

The engine 40 undergoes a cold start associated with a vehicle key-on event and begins operating at timepoint 301, with the engine state ON 320(1), the supplemental coolant heater state ON 330(1), and the three-way valve state associated with operation in the bypass fluidic circuit 90 340(1). The ECT 317 and heater core temperature 312 are initially low, and near ambient air temperature. The ECT 317 and heater core temperature 312 increase with operation of the engine 40 and the supplemental coolant heater 88, with the heater core temperature 312 initially increasing at a faster rate than the ECT 317, up to timepoint 302, at which point the two temperatures begin to converge. When the ECT 317 achieves the bypass fluidic circuit upper temperature threshold 315 at timepoint 303, the coolant system control routine 200 commands the three-way valve state to operate in the engine fluidic circuit 80 340(0) and soon thereafter commands the supplemental coolant heater state OFF 330(0). At timepoint 304, the ECT 317 and the heater core temperature 312 achieve the engine fluidic circuit upper temperature threshold 316, at which point the coolant system control routine 200 commands the engine 40 to the OFF state 320(0), prompting execution of an autostop routine. The ECT 317 and the heater core temperature 312 begin to decrease until they approach the bypass fluidic circuit lower temperature threshold 314 at timepoint 305. When the ECT 317 and the heater core temperature 312 reach the bypass fluidic circuit lower temperature threshold 314, the bypass fluidic circuit 90 is commanded, and the state of the three-way valve 82 that is associated with operation in the bypass fluidic circuit 90 is commanded 340(1). The supplemental coolant heater state initially remains in the OFF state 330(0) to allow continued heat extraction from the coolant before incurring electric load associated with heating the coolant using the supplemental coolant heater 88. This is shown by the portion of the coolant temperature between timepoints 305 and 306. At timepoint 306, the supplemental coolant heater 88 is commanded to the ON state 330(1), thus activating the supplemental coolant heater 88 to generate heat to transfer to the coolant contained in the bypass fluidic circuit 90. The ECT 317 continues to reduce, but the heater core temperature 312 begins to increase.

By way of comparison, T_ORG 311 depicts coolant temperature under a condition that includes continuing to command the state of the three-way valve 82 to operate in the engine fluidic circuit 80, indicating that T_ORG 311 may reach the engine fluidic circuit lower temperature threshold 313 at or near timepoint 306, and would thus prompt an earlier command to the engine 40 to execute an autostart routine. Under different operating conditions or ambient temperature conditions, the ECT 317 may reduce at different rates, or may remain unchanged, depending upon the heating capacity of the supplemental coolant heater 88 in relation to the system and the ambient temperature.

At timepoint 307, the ECT 317 reaches the engine fluidic circuit lower temperature threshold 313, prompting the coolant system control routine 200 to command the engine 40 to the ON state 320(1) by execution of an autostart routine. The supplemental coolant heater 88 remains in the ON state 330(1) initially.

At timepoint 308, as the ECT 317 approaches the bypass fluidic circuit upper temperature threshold 315, the coolant system control routine 200 transitions to the engine fluidic circuit 80 by commanding operation in the engine fluidic circuit 80 340(0) to extract heat from the water jacket 48 of the engine 40. At timepoint 309, the heater core temperature 312 reaches the bypass fluidic circuit upper temperature threshold 315 and the supplemental coolant heater state 330 transitions to the OFF state 330(0) when it is indicated that heat extraction through the heater core 86 will be sufficient to meet the cabin heating demands due to thermal inertias in the coolant, the supplement coolant heater 88 and the bypass fluidic circuit 90.

As such, the coolant system control routine 200 may be employed to extend vehicle operation in the engine OFF state and the charge-depletion mode by extracting additional heat from the coolant and employing the supplemental coolant heater 88. Under certain operating conditions, this may facilitate the engine OFF state under idle conditions.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a multi-mode powertrain system including an internal combustion engine, the method comprising:

circulating coolant to a heater core via an engine fluidic circuit that includes a water jacket of the internal combustion engine when temperature of the coolant is less than an engine fluidic circuit upper temperature threshold when the engine is in an ON state;

circulating coolant to the heater core via a second fluidic circuit that excludes the water jacket of the internal combustion engine when temperature of the coolant is greater than a second circuit lower temperature threshold when the engine is in an OFF state;

executing an engine autostart routine to operate the engine in the ON state when the temperature of the coolant is less than an engine fluidic circuit lower temperature threshold; and circulating coolant to the heater core via the engine fluidic circuit including the water jacket only when temperature of the coolant is greater than a second circuit upper temperature threshold subsequent to executing the engine autostart routine to operate the internal combustion engine in the ON state.

2. The method of claim 1, wherein the second fluidic circuit includes a supplemental coolant heater, and further comprising employing the supplemental coolant heater to heat the cooling fluid while circulating coolant to the heater core via the second fluidic circuit.

3. The method of claim 2, further comprising circulating coolant to the heater core via the engine fluidic circuit including the water jacket of the internal combustion engine only when a temperature of the coolant is greater than a second fluidic circuit upper temperature threshold subsequent to executing the engine autostart routine to operate the engine in the ON state.

4. The method of claim 3, wherein the engine fluidic circuit upper temperature threshold is greater than the second fluidic circuit upper temperature threshold.

5. The method of claim 1, wherein circulating coolant to the heater core via the engine fluidic circuit including the water jacket when temperature of the coolant is less than an engine fluidic circuit upper temperature threshold and the engine is in the ON state further comprises circulating coolant to the heater core via the engine fluidic circuit when temperature of the coolant is less than the engine fluidic circuit upper temperature threshold and the engine is in an ON state during a first cycle of the engine ON state after vehicle key-on.

6. The method of claim 1, further comprising commanding the engine OFF state when the coolant temperature exceeds the engine fluidic circuit upper temperature threshold.

7. The method of claim 1, wherein the heater core extracts heat from the coolant for transferring to a passenger compartment of a vehicle.

* * * * *